United States Patent
Noguchi et al.

(10) Patent No.: US 6,893,701 B2
(45) Date of Patent: May 17, 2005

(54) MAGNETIC DISK MEDIUM

(75) Inventors: Hitoshi Noguchi, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 5 days.

(21) Appl. No.: 10/712,021

(22) Filed: Nov. 14, 2003

(65) Prior Publication Data

US 2004/0096703 A1 May 20, 2004

(30) Foreign Application Priority Data

Nov. 15, 2002 (JP) ..................................... P. 2002-332266

(51) Int. Cl.$^7$ .................................................. G11B 5/82
(52) U.S. Cl. ................ 428/65.3; 428/336; 428/694 SL; 428/216
(58) Field of Search .............................. 428/64.1, 64.2, 428/65.3, 694 SL, 336, 216

(56) References Cited

U.S. PATENT DOCUMENTS 5,935,674 A    8/1999    Saito et al.

FOREIGN PATENT DOCUMENTS

JP    10-21530 A    1/1998

*Primary Examiner*—Stevan A. Resan
(74) *Attorney, Agent, or Firm*—Sughrue Mion, PLLC

(57) ABSTRACT

A magnetic disk medium having on a support a magnetic layer containing hexagonal ferrite powder dispersed in a binder, with the support having a thickness of 20 μm to 80 μm and the magnetic disk medium having an inside diameter X of 2 mm to 10 mm, an outside diameter Y of 20 mm to 50 mm, an X/Y ratio satisfying the relation $0.05 \leq X/Y \leq 0.20$ and a curl quantity of 1 mm or below, which is suitable for use in small-diameter portable computer equipment and video recorders, and besides, can attain a recording capacity of at least several hundred megabytes.

16 Claims, No Drawings

MAGNETIC DISK MEDIUM

FIELD OF THE INVENTION

The present invention relates to a magnetic disk medium, and particularly to a high-density magnetic disk medium having a diameter of 50 mm or below.

BACKGROUND OF THE INVENTION

In the field of magnetic disk media, it was a standard that 2 MB of MF-2HD using Co-modified iron oxide is mounted in a personal computer. Nowadays, however, the 2-Mbyte capacity of such a hard disk is said to be no longer sufficient because recent years have seen a sharp increase in volume of data to be addressed, and it is desired to enlarge the capacities of flexible disks. On the other hand, a magnetic disk medium made up of a thin magnetic layer and a functional non-magnetic layer has been developed, and 100 MB-class flexible disks are coming along. For instance, the magnetic disk medium disclosed in JP-A-10-21530 contains such features.

In the document cited above, it is defined that the magnetic disk medium, wherein a non-magnetic support, a substantially non-magnetic grounding layer and a magnetic layer containing a ferromagnetic metal or hexagonal ferrite powder dispersed in a binder are arranged in order of mention, has a specific relation between the thickness of the non-magnetic support and the outermost diameter of the recording area; as a result, the medium is successful in achieving high output and stable head penetration characteristic even in high-density recording. While the penetration evaluation in the document is made at a line recording density of 90 kfci, the disk medium cannot ensure satisfactory penetration characteristic when the evaluation is made at line recording densities higher than 90 kfci. Further, in the case of a magnetic disk medium not greater than 50 mm in diameter, or the so-called small-diameter disk, the attainment of sufficient recording capacity necessitates extending the recording area farthest toward the internal diameter side; as a result, head penetration on the internal diameter side becomes unstable.

When reproduction is performed using a highly sensitive magnetic reluctance head (an MR head) in particular for the purpose of heightening a recording density and not a traditional magnetic induction head, hitherto known magnetic disk media make high level of noises, so it is difficult for them to offer satisfactory performances.

Under recent circumstances where portable computer equipment, such as notebook PCs, and hand-held video recorders have rapidly come on strong, it has been desired to miniaturize magnetic recording media also. For instance, reduction in disk diameter to 50 mm or below makes it possible to apply the disks to PCMCIA card slots of personal computers. Although it is required for the disks to have recording capacities of at least several hundred megabytes equivalent to those of CD-ROM and CD-R, the reduction in disk diameter result in reduction of recording area, so it is difficult for the disks to meet two contrary requirements, attainment of high capacity and miniaturization.

SUMMARY OF THE INVENTION

The invention aims to provide a magnetic disk medium that is so small in diameter that it is usable in portable computer equipment and video recorders, and besides, attains a recording capacity of at least several hundred megabytes.

As a result of our intensive studies of the aforesaid problems, it has been found that the aim of the invention can be attained with the following magnetic disk medium:

(1) A magnetic disk medium comprising a support and a magnetic layer containing a binder and a hexagonal ferrite powder dispersed in the binder, wherein the support has a thickness of 20 $\mu$m to 80 $\mu$m, and the magnetic disk medium has an inside diameter X of 2 mm to 10 mm, an outside diameter Y of 20 mm to 50 mm, an X/Y ratio satisfying the relation $0.05 \leq X/Y \leq 0.20$ and a curl quantity of 1 mm or below.

(2) The magnetic disk medium according to item (1), wherein signals are capable of being recorded or reproduced thereon when the magnetic disk media is rotated at a rotational speed of 2,000 rpm to 8,000 rpm.

(3) The magnetic disk medium according to item (1), wherein signals recorded on the magnetic disk medium are capable of being reproduced with a magnetic reluctance head.

(4) The magnetic disk medium according to item (2), wherein signals recorded on the magnetic disk medium are capable of being reproduced with a magnetic reluctance head.

(5) The magnetic disk medium according to item (1), wherein the thickness of the support is 30 $\mu$m to 70 $\mu$m.

(6) The magnetic disk medium according to item (1), which has an X/Y ratio satisfying the relation $0.08 \leq X/Y \leq 0.15$.

(7) The magnetic disk medium according to item (1), which has a curl quantity of 0.5 mm or below.

(8) The magnetic disk medium according to item (1), wherein the hexagonal ferrite powder has a particle size of 10 nm to 35 nm.

(9) The magnetic disk medium according to item (1), which has a dimensional change rate of 0.05% or below when the medium is stored at 60° C.

(10) The magnetic disk medium according to item (1), which further comprises a subbing layer so that the support, the subbing layer, and the magnetic layer is in this order.

(11) The magnetic disk medium according to item (10), wherein the subbing layer has a thickness of 0.01 $\mu$m to 2.0 $\mu$m.

(12) The magnetic disk medium according to item (1), which further comprises an underlayer so that the magnetic layer, the underlayer, and the support is in this order.

(13) The magnetic disk medium according to item (12), wherein the underlayer contains a non-magnetic inorganic powder and a binder.

(14) The magnetic disk medium according to item (12), wherein the underlayer contains a carbon black.

(15) The magnetic disk medium according to item (12), which further comprises a subbing layer so that the support, the subbing layer, and the underlayer is in this order.

(16) The magnetic disk medium according to item (15), wherein the subbing layer has a thickness of 0.01 $\mu$m to 2.0 $\mu$m.

DETAILED DESCRIPTION OF THE INVENTION

For attaining a high capacity of several hundred megabytes by a small-sized magnetic disk medium, it is required to greatly increase a recording density.

Although the use of a high-sensitivity magnetic reluctance head (MR head) for reproduction can ensure sufficient output even under conditions of narrow tracks and high line recording densities, the media's noises are also amplified. Therefore, hitherto known high-noise media can neither offer sufficiently high signal-to-noise ratios nor achieve enhancement of recording density. By contrast, it has been found that the use of hexagonal ferrite powder as a magnetic substance can make it possible to attain a low noise and a high signal-to-noise ratio even in the case of using an MR head for reproduction. The hexagonal ferrite powder used in such a case, though it is described in detail hereinafter, is required to have an average tabular diameter of 35 nm or below and undergo thorough dispersion treatment in particular. Further, it has been found that, as far as these requirements are satisfied and a magnetic disk material measuring 45 mm in outside diameter (a diameter of outside circumference) is used, the signal-to-noise ratio necessary for recording on the disk at a capacity of, e.g., 1 GB or greater can be achieved, and a recording medium usable in portable computer equipment and video recorders as aimed by the invention becomes possible. However, it has also been found that, though signal-to-noise ratios on the necessary level can be secured, recording and reproduction cannot be made consistently under real operation conditions.

As a result of pursuing elucidation of causes of the inconsistencies, we have found that the inconsistencies can be attributed primarily to displacements in the direction perpendicular to a rotating disk, or runout (vertical vibration). More specifically, the invention makes it possible to control the runout by defining the support thickness, dimensions and curl quantity of a magnetic disk medium, and proves that the runout control enables improvement in head penetration characteristics and achievement of consistent recording and reproduction operations.

The following are thought to be reasons why those factors are defined in the invention. While it is a necessary condition for achieving high-density recording and reproduction that the medium has a high signal-to-noise ratio, it is also required to make head position adjustments relative to eccentricity of tracks by means of servo signals and allow the head to travel on the tracks.

For securing the recording densities aimed at by the invention, the track width is required to be 2 $\mu$m or below, preferably 1 $\mu$m or below. However, it has turned out that the head failed to faithfully follow such narrow tracks even by using a servo. We have narrowed down the source of such a failure to runout. And it has turned out that, as the runout of a disk caused deviation from the proper positional relation between a head and a track, adjustment with a servo was no longer sufficient.

A discovery in the invention is that the runout is suppressed by imposing restrictive conditions as mentioned above and thereby penetration characteristics are improved; as a result, a penetration window is secured and satisfactory tracking is attained.

In the invention, the outside diameter of a disk is from 20 mm to 50 mm. This range of disks' outside diameters is not merely suitable for portable recording devices, but disk's outside diameters greater than 50mm disable a head from following tracks because the outer regions of the disks suffer a considerable increase in runout, so a high-density recording medium itself as an object of the invention cannot be obtained.

The inside diameter X (mm) of the present magnetic disk medium is from 2mm to 10 mm. When the inside diameter is smaller than 2 mm, it is difficult for the disk to chuck a spindle with high accuracy. On the other hand, increasing the inside diameter beyond 10 mm is undesirable because the recording area is reduced.

The outside diameter Y (mm) of the present magnetic disk medium is front 20 mm to 50 mm. When the outside diameter is increased beyond 50 mm, application to a PCMCIA slot becomes difficult. When the outside diameter is smaller than 20 mm, on the other hand, several hundred megabyte-capacity cannot be attained.

The ratio of the inside diameter to the outside diameter of the magnetic disk medium is expressed in the relation $0.05 \leq X/Y \leq 0.20$, preferably $0.08 \leq X/Y \leq 0.15$.

The thickness of a support is from 20 $\mu$m to 80 $\mu$m, preferably from 30 $\mu$m to 70 $\mu$m. When the support is thinner than 20 $\mu$m, the disk rotation becomes unstable, particularly in a high-speed rotation region, and the runout tends to become great. When the support is thicker than 100 $\mu$m, it is hard to gain stability in a state of rotation by centrifugal force, and the runout tends to become great in a low-speed rotation region.

The curl quantity of the magnetic disk medium is 1 mm or below, preferably 0.5 mm or below. The smaller the curl quantity is, the smaller the runout is. For minimizing the curl quantity, it is effective to control a storage time before stamping into a disk shape and to select an appropriate heat treatment condition after the stamping. Enhancement of disk's flatness can effect reduction in quantity of runout. For this enhancement, it is suitable that variations in thickness values of a support and coatings be limited to 10% or below.

To the invention, it is appropriate that signals be recorded and reproduced at a rotational speed of from 2,000 to 8,000 rpm. When the rotational speed is lower than 2,000 rpm, the centrifugal force acting on the magnetic disk medium is small, so the rotation with high stability cannot be achieved and there is a tendency toward an increase in runout. When the rotational speed is higher than 8,000 rpm, on the other hand, the centrifugal force becomes too great. As a result, as in the above case, the rotation tends toward instability and the runout is apt to become great.

It is advantageous for the present medium to have a dimensional change rate of, e.g., 0.05% or below when the medium is stored at 60° C. In the case of using the present medium in portable recording systems, the medium is required to be stable toward changes in temperature and humidity because such recording systems are often used outdoors. According to our finding, as far as the size of a medium measured at room temperature (23° C.) varies by 0.05% or below, preferably 0.02% or below, between before and after one-week storage at 60° C., the tracking with high stability can be attained under a wide range of circumstances even at high recording densities adopted in the present medium.

Adoption of the following measures or properties can contribute to the present effects.

It is advantageous to eliminate minute pits and distortions from a magnetic disk medium. Minute deformation induces higher-order runout, and tends to make servo tracking difficult. With respect to the runout in the inner region of a disk in particular, the method applied for bonding a magnetic disk medium to a center core is of importance. When an adhesive is used, it is appropriate that the adhesive be coated uniformly; while, when an adhesive sheet is used, it is appropriate that the variation in sheet thickness be controlled to 10% or below. Application of a hot-melt method is favorable because it can reduce runout in the inner region in particular. In general, the runout in the inner region is smaller than that in the outer region. However, when fixation to the center core as the center of a disk is poor in accuracy, the runout in the inner region sometimes becomes greater than that in the outer region. In the inner region where the end is fixed to the center core, runout is not merely apt to cause a deviation in the alignment of a head with a track, but the inner region has effective stiffness higher than the outer region, so it is difficult for the head to follow tracks. In other words, the inner region is disadvantageous for tracking. Therefore, it is advantageous to reduce runout to a greater extent in the inner region than in the outer region. Additionally, the runout in the outer region and that in the inner region are influenced by each other. For instance, when the runout in the outer region is great, its influence is exerted on the runout in the inner region to result in the tendency being toward an increase in runout in the inner region.

The term "curl quantity" used in the invention means a value determined by the following measurement.

A magnetic disk with a center core is made upright by supporting the center core, horizontal displacement of the outside edge of the magnetic disk from the position at the inside edge is measured with a laser displacement gauge while making a complete circuit of the magnetic disk, and a maximum value is found from absolute values of the thus measured displacements. The maximum value thus found is defined as the curl quantity. Incidentally, depending on the curing direction, the position of the laser beam on contact with the outside edge of the magnetic disk may be either on the plus side or on the minus side relative to upright disk plane.

The present magnetic disk is illustrated below on an element basis.

(Hexagonal Ferrite Powder)

Examples of hexagonal ferrite powder which can be contained in the present uppermost layer include a barium ferrite powder, a strontium ferrite powder, a lead ferrite powder, a calcium ferrite powder and substitution products of these ferrite powders wherein the divalent metals are each substituted by, e.g., Co, Zn or Nb. Specifically, a magnetoplumbite-type barium or strontium ferrite powder, a magnetoplumbite-type ferrite powder consisting of particles whose surfaces are covered with spinel, and a magnetoplumbite-type barium or strontium ferrite powder further containing in part a spinel phase are usable in the present uppermost layer. These hexagonal ferrite powders may be doped with various atoms other than the proper atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Examples of a combination of elements generally usable as dopants include Co—Ti, Co—Ti—Zr, Co—Ti—Zn, Ni—Ti—Zn, Nb—Zn—Co, Sb—Zn—Co and Nb—Zn. Depending on starting materials and the production method used, ferrite powders can contain specific impurities The suitable particle size is from 10 to 35 nm, preferably from 15 to 25 nm, as expressed in hexagonal tabular diameter. When the diameter is smaller than 10 nm, stable magnetization cannot be attained due to thermal fluctuations. On the other hands, diameters greater than 35 nm become a cause of high noises, so they are unfit for high-density magnetic recording aimed at by the invention. The suitable tabular ratio (tabular diameter/tabular thickness ratio) is from 2 to 6, preferably from 2.5 to 3.5. Small tabular ratios are favorable from the viewpoint of high filling capacity in the magnetic layer, but they cannot offer satisfactory orientability. On the other hand, tabular ratios greater than 6 give rise to stacking of particles to result in high noises. Particles in this size range show their individual specific surface areas ($S_{BET}$) determined by the BET method in the range of 30 to 100 $m^2$/g. The specific surface areas are on the whole consistent with the values arithmetically calculated from tabular diameters and tabular thicknesses of particles. In general, the particles are more suited the narrower distributions the particles have with respect to their tabular diameters and tabular thicknesses. Although it is difficult to convert such correspondence into a numerical value, comparisons can be made by randomly selecting 500 particles from a TEM photograph of particles and making measurements. The measured values don't have a Gaussian distribution in many cases, but the ratio of a standard deviation $\sigma$ to an average size can be calculated and found to be from 0.1 to 2.0. In order to make particles have a narrow size distribution, it is carried out not only to render a reaction system for forming particles as homogeneous as possible but also to subject the formed particles to distribution-improving treatment. For instance, a method of selectively dissolving superfine particles in an acid solution is known to be applicable. The suitable coercive force Hc measured as a magnetic substance is from 1,500 Oe to 4,000 Oe (120 to 320 kN/m). The higher Hc a magnetic substance has, the more the magnetic substance favors high-density recording. However, limits are imposed on Hc by capabilities of a recording head used. The Hc can be controlled by properly choosing particle dimensions (tabular diameter, tabular thickness), species and quantities of constituent elements, substitution sites of elements, and reaction conditions for forming particles. The suitable saturation magnetization σs is from 40 to 60 $A \cdot m^2$/kg. Although the higher the σs value, the better effect it can bring about, there is a tendency of σs to become smaller with decrease in particle size. In dispersing a magnetic substance, it is also carried out to treat the surfaces of magnetic particles with a dispersion medium and a material compatible with polymers. The compounds usable for surface treatment may be inorganic or organic. Typical examples of such compounds include oxides and hydroxides of Si, Al and P, various kinds of silane coupling agents and various kinds of titanium coupling agents. The proportion of a surface treatment agent to the magnetic substance to be treated therewith is 0.1 to 10% by weight. The pH of a magnetic substance is important for dispersion. In general, the pH ranges from about 4 to about 12, and there is an optimum value for the pH depending on what kinds of a dispersing medium and a polymer are used. However, the pH is chosen from a range of about 6 to about 10 from the viewpoints of chemical stability and keeping quality of a recording medium. The moisture contained in a magnetic substance has also an effect on dispersion. Although there is an optimum value depending on the dispersing medium and the polymer used, the moisture content is generally chosen from the range of 0.01 to 2.0% by weight. Examples of a method for producing hexagonal ferrite powder include (1) a glass crystallization method, wherein barium oxide, iron oxide, metal oxides for replacing iron and boron oxide as a glass forming material are mixed together in their respective amounts enabling the desired composition, fused and then quenched to yield an amorphous matter, and the amorphous matter is subjected to heating treatment again, and then to washing and grinding to produce a barium ferrite crystalline powder; (2) a hydrothermal reaction method, wherein a metal salt solution having a barium ferrite composition is neutralized with an alkali, by-products is removed, and the liquid phase thus obtained is heated at a temperature of at least 100° C., washed, dried, and then ground to prepare a barium ferrite crystalline powder; and (3) a coprecipitation method, wherein a metal salt solution having a barium ferrite composition is neutralized with an alkali, and subjected successively to removal of by-products, drying, treatment at a temperature of 1,100° C. or below and grinding, thereby preparing a barium ferrite crystalline powder. And any of these methods may be used in the invention.

(Underlayer)

It is advantageous for the present magnetic disk medium to have an underlayer between a magnetic layer and a support. The suitable underlayer is a layer containing as main components a non-magnetic inorganic powder and a binder. The non-magnetic inorganic powder can be selected from inorganic compounds, such as metal oxides, metal carbonates, metal sulfates, metal nitrides, metal carbides or metal sulfides. Examples of an inorganic compound usable as such a powder include aluminum oxide having an α-alumina content of at least 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesiumoxide, tungstenoxide, zirconium oxide, boron nitride, zinc oxide, calcium carbonate, calcium sulfate, barium sulfate, molybdenum disulfide and combinations of two or more thereof. Of these inorganic compounds, titanium dioxide, zinc oxide, iron oxide and barium sulfate are used to advantage over others because these compounds have narrow particle size distributions and many means to impart functions. In particular, it is effective to use titanium dioxide or α-iron oxide. It is appropriate that the particle sizes of those non-magnetic powders be in a range of 0.005 to 2 µm. However, if needed, the same effect may be produced by combined use of non-magnetic powders having different particle sizes or independent use of a non-magnetic powder having a board size distribution. In particular, non-magnetic powders having their particle sizes in the range of 0.01 µm to 0.2 µm are preferred over the others. When the non-magnetic powder is granular metal oxide, the suitable average diameter thereof is 0.08 µm or below; while, in the case of acicular metal oxide, the suitable average length is 0.3 µm or below. The tap density of non-magnetic powder is generally from 0.05 to 2 g/ml, preferably from 0.2 to 1.5 g/ml. The water content of non-magnetic powder is generally in the range of 0.1 to 5 weight %, preferably 0.2 to 3 weight %, particularly preferably 0.3 to 1.5 weight %. The pH of non-magnetic powder is generally in the range of 2 to 11, but the pH range of 5.5 to 10 is preferred in particular. The specific surface area $S_{BET}$ of non-magnetic powder is generally from 1 to 100 m$^2$/g, preferably from 5 to 80 m$^2$/g, and particularly preferably from 10 to 70 m$^2$/g. The suitable crystallite size of non-magnetic powder is from 0.004 µm to 1 µm, preferably 0.04 µm to 0.1 µm. The oil absorptive capacity using dibutyl phthalate (DBP) is in the range of generally 5 to 100 ml/100 g, preferably 10 to 80 ml/100 g, particularly preferably 20 to 60 ml/100 g. The specific gravity is generally from 1 to 12, preferably from 3 to 6. The shape of non-magnetic powder may be any of acicular, spherical, polyhedral and tabular shapes. The suitable Mohs' hardness of non-magnetic powder is from 4 to 10. The amount of stearic acid (SA) adsorbed to non-magnetic powder is in the range of generally 1 to 20 µmol/m$^2$, preferably 2 to 15 µmol/m$^2$, particularly preferably 3 to 8 µmol/m$^2$. The suitable pH of SA-adsorbed powder is between 3 and 6. It is appropriate that $Al_2O_3$, $SiO_2$, $TiO_2$, $ZrO_2$, $SnO_2$, $Sb_2O_3$, ZnO or $Y_2O_3$ be present on the surface of a non-magnetic inorganic powder by subjecting the powder to surface treatment. Of these oxides, $Al_2O_3$, $SiO_2$, $TiO_2$ and $ZrO_2$, especially $Al_2O_3$, $SiO_2$ and $ZrO_2$, are preferred over the others from the viewpoint of dispersibility. These oxides may be used in combination or independently. Such a surface treatment layer may be formed by co-precipitation of oxides, if desired, or by providing an alumina layer first and then silica layer, or vise versa. In addition, the surface treatment layer formed may be porous depending on the intended purposes, but it is generally appropriate that the layer be uniform and dense. Needless to say, the quantity of surface treatment should be optimized according to binder and dispersing conditions adopted.

Examples of non-magnetic powder usable for the present underlayer include Nanotite produced by Showa Denko K.K., HIT-100 and ZA-G1 produced by Sumitomo Chemical Co., Ltd., α-hematite DPN-250, DPN-250BX, DPN-245, DPN-270BX, DBN-SA1 and DEN-SA3 produced by Toda Kogyo Corp., titanium dioxide TTO-51B, TTO-55A, TTO-55B, TTO-55C, TTO-55S, TTO-55D and SN-100 produced by Ishihara Sangyo, α-hematite E270, E271, E300 and E303 produced by Ishihara Sangyo, titanium dioxide STT-4D, STT-30D, STT-30 and STT-65C produced by Titan Kogyo, α-hematite α-40 produced by Titan Kogyo, MT-100S, MT-100T, MT-150W, MT-500B, MT-600B, MT-100F and MT-500HD produced by TYCA Corporation, FINEX-25, BF-1, BF-10, BF-20 and ST-M produced by Sakai Chemical Industry Co., Ltd., DEFIC-Y and DEFIC-R produced by Dowa Mining Co., Ltd., AS2BM and TiO2P25 produced by Nippon Aerosil Corporated, 100A and 500A produced by Ube Industries Ltd., and burned substances thereof. Of these products, titanium dioxide and α-iron oxide products are preferred in particular.

By mixing carbon black in the underlayer, known effects can be imparted to the underlayer. For instance, the surface electric resistance (Rs) can be lowered, the light transmittance can be reduced, and the desired micro Vickers hardness can be attained. In addition, the carbon black contained in the underlayer can produce a lubricant storage effect. As to the kinds of carbon black capable of producing such effects, furnace black for rubber use, thermal black for rubber use, carbon black for color and acetylene black are usable. It is appropriate to select the kind of carbon black so that characteristics as mentioned below are optimized depending on the desired effects. In some cases, greater effects can be achieved by combined use of different kinds of carbon black.

The carbon black used in the underlayer generally has its specific surface area in the range of 100 to 500 m$^2$/g, preferably 150 to 400 m$^2$/g, and its DBP absorptive capacity in the range of 20 to 400 ml/100 g, preferably 30 to 200 ml/100 g. The average particle size of the carbon black used is from 5 to 80 nm, preferably from 10 to 50 nm, particularly preferably from 10 to 40 nm. Further, it is appropriate that the pH, the water content and the tap density of carbon black used be from 2 to 10, from 0.1 to 10 weight % and from 0.1 to 1 g/ml, respectively. Examples of carbon black usable in the present underlayer include BLACKPEARLS 2000, 1300, 1000, 900, 800, 880 and 700, and VULCAN XC-72 produced by Cabot Co., #3050B, #3150B, #3250B, #3750B, #3950B, #950, #650B, #970B, #850B, MA-600, MA-230, #4000 and #4010 produced by Mitsubishi Chemical Industries Ltd., CONDUCTEX SC, RAVEN 8800, 8000, 7000, 5750, 5250, 3500, 2100, 2000, 1800, 1500, 1255 and 1250 produced by Colombia Carbon Co., and KETJENBLACK EC produced by Akuzo Co. In advance of its use, carbon black may be surface-treated with a dispersing agent, a resin may be grafted onto carbon black, or carbon black surface may be partly converted into graphite. On the other hand, carbon black may be dispersed into a binder before it is added to a coating composition. The thus pre-treated carbon black can be used in a proportion lower than 50 weight % to the non-magnetic inorganic powder (not including carbon black), and that in a proportion lower than 40 weight % to the total weight of the underlayer. The carbon black of various kinds as recited above may be used alone or as combinations. Details of various kinds of carbon black usable in the invention can refer to, e.g., *Carbon Black Binran* (which may be translated by the English title "*Handbook of Carbon Black*"), compiled by Carbon Black Association.

To the underlayer, organic powders can also be added depending on the intended purposes. Examples of an organic powder which can be added include acrylic-styrene resin powder, benzoguanamine resin powder, melamine resin powder and phthalocyanine pigments. Further, polyolefin resin powder, polyester resin powder, polyamide resin powder, polyimide resin powder and polyfluoroethylene resin powder may be used. For production of those organic powders, the methods described in JP-A-62-18564 and JP-A-60-255827 can be adopted.

Binder resins, lubricants, dispersing agents, additives, solvents and dispersing methods usable in the underlayer include those usable in the magnetic layer described below, respectively. As to the amount and the type of binder resin used and the amounts and the kinds of additives and dispersing agents added, in particular, hitherto known arts concerning magnetic layers are applicable.

The binders used in the invention may be any of resins hitherto used as binders, including known thermoplastic resins, thermosetting resins, reactive resins and mixtures thereof.

Thermoplastic resins usable herein are those having their glass transition temperatures in the range of −100 to 150° C., their number average molecular weights in the range of 1,000 to 200,000, preferably 10,000 to 100,000, and polymerization degrees of the order of 50–1,000.

Examples of such thermoplastic resins include homopolymers and copolymers containing constituent units derived from monomers, such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether; polyurethane resin, and various resins of rubber type. And examples of thermosetting resins or reactive resins include phenol resin, epoxy resin, polyurethane resin of cure type, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate. Details of these resins are described, e.g., in *Plastics Handbook*, published by Asakura Shoten. In addition, it is possible to use known electron beam-curable resins in each layer. Detailed explanation of such resins and manufacturing methods thereof can be found in JP-A-62-256219. The resins as recited above can be used alone or as a combination of two or more thereof. Examples of a resin combination include a combination of polyurethane resin and at least one resin selected from the groups consisting of vinyl chloride resin, vinyl chloride-vinyl acetate copolymer, vinyl chloride-vinyl acetate-vinyl alcohol terpolymer and vinyl chloride-vinyl acetate-maleic anhydride terpolymer, and a combination of the foregoing combination and polyisocyanate.

As the makeup of the polyurethane resin, known ones including polyesterpolyurethane, polyetherpolyurethane, polyetherpolyesterpolyurethane, polycarbonatepolyurethane, polyesterpolycarbonatepolyurethane and polycaprolactone-polyurethane can be adopted. For enhancing dispersibility and durability of all the binders recited above, it is appropriate that at least one polar group selected from —COOM, —SO$_3$M, —OSO$_3$M, —P=O(OM)$_2$, —O—P=O(OM)$_2$ (wherein M is a hydrogen atom or an alkali metal), —OH, —NR$_2$, —N$^+$R$_3$ (wherein R is a hydrocarbon group), epoxy group, —SH or —CN be introduced into each binder by copolymerization or addition reaction on an as needed basis.

The suitable content of such polar groups in each binder is from $10^{-1}$ to $10^{-8}$ mole/g, preferably from $10^{-2}$ to $10^{-6}$ mole/g.

Examples of those binders usable in the invention include VAGH, VYHH, VMCH, VAGF, VAGD, VROH, VYES, VYNC, VMCC, XYHL, XYSG, PKHH, PKHJ, PKHC and PKFE produced by Union Carbide Co., MPR-TA, MPR-TA5, MPR-TAL, MPR-TSN, MPR-TMF, MPR-TS, MPR-TM and MPR-TAO produced by Nissin Chemical Industry Co., Ltd., 1000W, DX80, DX81, DX82, DX83 and 100FD produced by Electro Chemical Industry Co., Ltd., MR-104, MR-105, MR110, MR100, MR555 and 400X-110A produced by ZEON CORP., Nipporan N2301, N2302 and N2304 produced by Nippon Polyurethane Industry Co., Ltd., Pandex T-5105, T-R3080 and T-5201, Barnoc D-400 and D-210-80, and Crysbon 6109 and 7209 produded by Dainippon Ink & Chemicals, Inc., Vylon UR8200, UR8300, UR-8700, RV530 and RV280 produced by Toyobo Co., Daiferamine 4020, 5020, 5100, 5300, 9020, 9022 and 7020 produced by Dainichiseika C. & C. Mfg., MX5004 produced by Mitsubishi Chemical Industries Ltd., Sanprene SP-150 produced by Sanyo Chemical Industries Co., Ltd., and Saran F310 and F210 produced by Asahi Chemical Industry Co., Ltd.

Such binders are used in a proportion ranging generally from 5 to 50 weight %, preferably from 10 to 30 weight %, to non-magnetic powder in the underlayer or hexagonal ferrite powder in the magnetic layer. When vinyl chloride resin is used as binder, the suitable proportion thereof is in the range of 5 to 30 weight %, when polyurethane resin is used as binder, the suitable proportion thereof is in the range of 2 to 20 weight %, and when polyisocyanate is used, the suitable proportion thereof is in the range of 2 to 20 weight %. And the combined use of these resins are advantageous. However, it is possible to use polyurethane alone or a combination of polyurethane with polyisocyanate alone in the case where a slight amount of chlorine evolved by dechlorination causes head corrosion. When polyurethane is used in the invention, it is advantageous that the polyurethane has a glass transition temperature in a range of −50 to 150° C., preferably 0 to 100° C., endures an elongation of 100 to 2,000% and a stress of 0.05 to 10 kg/mm$^2$ (0.49 to 98 MPa) before it breaks and has a yield point of 0.05 to 10 Kg/mm$^2$ (0.49 to 98 MPa).

The present magnetic disk medium may have more than two constituent layers including an underlayer and a magnetic layer. It goes without saying that the binder content, the proportions of vinyl chloride resin, polyurethane resin, polyisocyanate and other resins in the total binder or the physical characteristics of the foregoing resins may vary among the constituent layers, and the molecular weight and the polar group content may vary among the resins forming the magnetic layer, if needed. If anything, it is better to optimize those factors on a constituent layer basis. In this case, known arts of multiple magnetic layer are applicable. When the binder content varies from one constituent layer to another, for instance, an increase of a binder content in the magnetic layer is effective in reducing abrasion at the magnetic layer surface, while an increase of a binder content in the underlayer can offer more flexibility and improve the touch of a head on the magnetic disk.

Examples of polyisocyanate usable in the invention include isocyanates, such as tolylene diisocyanate, 4,4'-diphenylmethanediisocyanate, hexamethylenediisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates. Commercially available products of the isocyanates as recited above are, e.g., Colonate L, Colonate HL, Colonate 2030, Colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.). In each layer, these products may be used alone or in a state that two or more thereof are combined utilizing a difference in curing reactivity.

(Carbon Black & Abrasives)

In the present magnetic layer, furnace black for rubber use, thermal black for rubber use, carbon black for color and acetylene black are usable. More specifically, carbon black suitable for the present magnetic layer has its specific surface area in the range of 5 to 500 $M^2/g$, its DBP absorptive capacity in the range of 10 to 400 ml/100 g, its average particle size in the range of 5 to 300 nm, its pH in the range of 2 to 10, its water content in the range of 0.1 to 10 weight %, and its tap density in the range of 0.1 to 1 g/ml. Examples of carbon black usable in the invention include BLACKPEARLS 2000, 1300, 1000, 900, 905, 800 and 700, and VULCAN XC-72 produced by Cabot Co., #80, #60, #55, #50 and #35 produced by Asahi Carbon Co., Ltd., #2400B, #2300, #900, #1000, #30, #40, #10B produced by Mitsubishi Chemical Industries Ltd., CONDUCTEX SC, RAVEN 150, 50, 40, 15, RAVEN-MT-P produced by Colombia Carbon Co., and KETJENBLACK EC produced by Nippon EC. In advance of its use, carbon black may be surface-treated with a dispersing agent, a resin may be grafted onto carbon black, or carbon black surface may be partly converted into graphite. On the other hand, carbon black may be dispersed into a binder before it is added to a magnetic coating composition. Those carbon black products may be used alone or as combinations. It is appropriate that the carbon black as recited above be used in a proportion of 0.1 to 30 weight % to the magnetic substance. To the magnetic layer, carbon black can impart functions of preventing from electrification, reducing friction coefficient, shielding from light and heightening film strength. These functions vary depending on the sort of carbon black used. Therefore, on the basis of various properties as mentioned above, including particle size, oil absorption, electric conductivity and pH, it is naturally possible to change the sort, the amount and combination of carbon black products to suit the magnetic layer and the underlayer, respectively, depending on the intended purposes. If anything, those factors should be optimized in each layer. Details of various sorts of carbon black usable in the present magnetic layer can refer to, e.g., *Carbon Black Binran* (which may be translated by the English title "*Handbook of Carbon Black*"), compiled by Carbon Black Association.

An abrasive usable in the magnetic layer is mainly made up of one or more of known materials having Mohs' hardness of at least 6, such as aluminum oxide having an α-alumina content of at least 90%, β-alumina, silicon carbide, chromium oxide, cerium oxide, α-iron oxide, corundum, artificial diamond, silicon nitride, silicon carbide, titanium carbide, titanium oxide, silicon dioxide and boron nitride. Further, these abrasives may be used in the form of complex (obtained by treating the surface of one abrasive with another abrasive). Although those abrasives sometimes contain compounds or elements other than their main components, they can function as abrasives as far as the proportion of their respective main components is not lower than 90 weight %. The suitable average particle size of those abrasives is from 0.01 to 2 μm. In order to enhance electromagnetic conversion characteristics in particular, it is advantageous that those abrasives have narrow particle size distributions. For elevation of durability, on the other hand, abrasives having different particle sizes are combined as required, or abrasives may be used individually as far as their particle size distributions are broad. It is appropriate that the abrasives used in the invention have their tap density in the range of 0.3 to 2 g/ml, their water content in the range of 0.1 to 5 weight %, their pH in the range of 2 to 11 and their specific surface area in the range of 1 to 30 $m^2/g$. The abrasives may have any of acicular, spherical and cubic shapes. However, shapes having edges in parts are advantageous from the viewpoint of abrasive capability. Examples of commercially available abrasives include AKP-12, AKP-15, AKP-20, AKP-30, AKP-50, HIT-20, HIT-30, HIT-55, HIT-60, HIT-70, HIT-80 and HIT-100, which are products of Sumitomo Chemical Co., Ltd.; ERC-DBM, HP-DBM and HPS-DBM, which are products of Reynolds Co.; WA10000, a product of Fujimi Corporation; UB20, a product of Uemura Kogyo & Co., Ltd.; G-5, Kuromex U2 and Kuromex U1, products of Nippon Chemical Industrial Co., Ltd.: TF100 and TF140, products of Toda Kogyo Corp.; Beta Random Ultrafine, a product of Ibiden Co. Ltd.; and B-3, a product of Showa Mining Co., Ltd. These abrasives can be also added to the underlayer, if desired. By adding abrasives to the underlayer, the surface profiling can be controlled, or protuberances of abrasives from the surface can be controlled. Needless to say, optimum values are selected for the sizes and the amounts of abrasive particles added to the magnetic layer and the underlayer.

(Additives)

Compounds having a lubricating effect, an anti-static effect, a dispersing effect or a plasticizing effect can be used as additives in the present magnetic layer and underlayer. Examples of such compounds usable as additives include molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkyl phosphoric acid ester and alkali metal salts thereof, alkylsulfuric acid ester and alkali metal salts thereof, polyphenyl ether, phenylphosphonic acid, aminoquinone, various types of silane coupling agent, titanium coupling agent, fluorine-containing alkylsulfuric acid ester and alkali metal salts thereof, monobasic fatty acid containing 10 to 24 carbon atoms (which may contain unsaturated bonds or branched chains) and metal salts of such a fatty acid (e.g., Li, Na, Ka and Cu salts), monohydric to hexahydric alcohol containing 12 to 22 carbon atoms (which may have unsaturated bonds or branched chains), alkoxyalcohol containing 12 to 22 carbon atoms, mono-, di- or trifatty acid ester produced by reaction of 10-24C monobasic fatty acid (which may have unsaturated bonds or branched chains) with one kind of alcohol chosen from 2-12C monohydric to hexahydric alcohol (which may have unsaturated bonds or branched chains), fatty acid ester of polyalkylene oxide monoalkyl ether, fatty acid amide containing 8 to 22 carbon atoms, and aliphatic amine containing 8 to 22 carbon atoms.

More specifically, the foregoing fatty acids includes capric acid, caprylic acid, lauric acid, myristic acid, palmitic acid, stearic acid, behenic acid, oleic acid, elaidic acid, linolic acid, linolenic acid, and isostearic acid. The foregoing esters includes butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate and neopentyl glycol didecanoate. The foregoing alcohol includes oleyl alcohol, stearyl alcohol, and lauryl alcohol. Further, nonionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acid groups such as carboxyl, sulfo, phospho, sulfate and phosphate groups, and amphoteric surfactants, such as amino acids, aminosulfonicacids, sulfuric or phosphoric acid esters of aminoalcohols, and alkyl betaine-type surfactants, can be used. Details of these surfactants are described in *Kaimen Kasseizai Binran* (which may be translated by the English title "*Handbook of Surfactants*"), published by Sangyo Tosho K.K. The lubricants and anti-static agents as recited above are not always required to be 100% pure, but may contain impurities, such as isomers, materials remaining unreacted, by-products, decomposed matter and oxides. The allowable level of contamination with such impurities is below 30 weight %, preferably below 10 weight %.

Those lubricants and surfactants usable in the invention are each different in physical actions from every other one. So it is required that the types and amounts of surfactants and lubricants to be used and the proportion between lubricants capable of producing a synergistic effect be determined optimally depending on the intended purpose. For instance, it is thought that oozing from the surface is controlled by using fatty acids having different melting points in the underlayer and the magnetic layer, respectively, or by using esters differing in boiling point, melting points or polarity in the underlayer and the magnetic layer, respectively, coating stability is enhanced by controlling the amount of surfactants added, and lubricating effect is elevated by adding a greater amount of lubricant to the interlayer. Needless to say, the cases mentioned above should not be construed as limiting the scope of the invention. In general the total proportion of lubricants can be chosen from the range of 0.1 to 50 weight %, preferably 2 to 25 weight %, to the magnetic substance or the non-magnetic inorganic powder.

All or part of additives used in the invention may be added in any of processes for preparing a magnetic or non-magnetic coating composition. For instance, there may be cases where the additives are mixed with a ferromagnetic powder prior to the kneading process, they are added during the process of kneading a ferromagnetic powder, a binder and a solvent, they are added in the process of dispersion, they are added after the dispersion process, and they are added just before coating. On the other hand, simultaneous or successive application of all or part of the additives to an already formed magnetic layer sometimes allows the desired purposes to be achieved. Further, in some cases, the magnetic layer surface may be coated with a lubricant after calendering or slitting operation.

For preparing the coating compositions used in the invention, known organic solvents are usable, with examples including the solvents described in JP-A-6-68453.

(Layer Structure)

Between support and the underlayer or the magnetic layer, a subbing layer may be provided for the purpose of adhesion enhancement. The suitable thickness of the subbing layer is from 0.01 to 2 $\mu$m, preferably from 0.02 to 0.5 $\mu$m. Although the present disk medium is generally a double-sided magnetic disk medium which has underlayers and magnetic layers on both sides of a support, there's nothing wrong with providing an underlayer and a magnetic layer on only one side of a support. In this case, a backing layer may be provided on the side opposite to the magnetic layer side for producing anti-static and curl compensation effects. The thickness thereof is from 0.1 to 4 $\mu$m, preferably from 0.3 to 2.0 $\mu$m. To such subbing and backing layers, known ones are applicable.

The magnetic layer thickness of the present magnetic medium is optimized depending on the specifications of a head used and the frequency band of recording signals. The suitable thickness of the magnetic layer is generally from 0.01 to 1.0 $\mu$m, preferably from 0.03 to 0.2 $\mu$m. The present magnetic layer may be divided into two or more layers differing in magnetic characteristics, and thereto known compositions for magnetic layers having multilayer structures are applicable.

The thickness of the underlayer is generally from 0.2 $\mu$m to 5.0 $\mu$m, preferably from 0.5 $\mu$m to 3.0 $\mu$m, particularly preferably from 1.0 $\mu$m to 2.5 $\mu$m. Additionally, the underlayer has its effects so far as it is non-magnetic in a substantial sense. Even when magnetic substances are present as impurities in the underlayer or intentionally added thereto in a small amount, the underlayer can produce the present effects. So it goes without saying that the composition in such a case can be regarded as substantially the same as the present one. The expression "the underlayer is non-magnetic in a substantial sense" as used herein means that the underlayer has a residual magnetic flux density of 10 mT or below or a coercive force of 100 Oe (8 kA/m) or below. However, it is preferable that the underlayer has neither residual magnetic flux density nor coercive force.

(Support)

As a support, known materials are usable in the invention. Suitable examples thereof include polyethylene terephthalate (PET), polyethylene naphthalate (PEN), aramide and polycarbonate films. The film thickness is optimized according to a disk diameter and a disk rotational speed. Specifically, as mentioned above, the film thickness is generally from 20 $\mu$m to 100 $\mu$m.

If necessary, it is also possible to use supports of laminate type for controlling the surface roughness on the magnetic layer side and that on the base side independently. Those supports may undergo in advance corona discharge, plasma treatment, adhesion-increasing treatment, heat treatment and dust cleaning treatment. To accomplish the aim of the invention, it is appropriate that the support used have a center-plane average surface roughness Ra of 10 nm or below, preferably 5 nm or below, as measured with a surface roughness tester Model TOPO-3D made by WYKO Co. It is more appropriate that the support have not only small center-plane average surface roughness but also no coarse projections standing at least 200 nm high. Further, the surface roughness profile can be controlled freely by choosing the size and the amount of fillers added to the support as required. Examples of such fillers include oxides or carbonates of Ca, Si and Ti, and organic fine powders, such as particulate acrylic resin. As to other surface roughness characteristics of the support, it is appropriate that the support have a maximum height Rmax of 1 μm or below, a ten-point average roughness Rz of 200 nm or below, a center-plane peak height Rp of 200 nm or below, a center-plane valley depth Rv of 200 nm or below and an average wavelength λa of 5 to 300 μm. To achieve the desired electromagnetic conversion characteristics and durability, distribution of projections on the support surface can be controlled arbitrarily by the use of fillers, and the number of the projections ranging in size from 0.01 to 1 μm can be controlled within the range of 0 to 2,000 per 0.1 mm$^2$.

The suitable thermal shrinkage ratio of the support is 0.5% or below, preferably 0.3% or below, under heating at 105° C. for 30 minutes, 0.3% or below, preferably 0.2% or below, under heating at 80° C. for 30 minutes, and 0.05% or below, preferably 0.02% or below, under heating at 60° C. for 1 week. In addition, it is favorable that the temperature expansion coefficient be from $10^{-4}$ to $10^{-8}$/° C., preferably from $10^{-5}$ to $10^{31}$ $^6$/° C., and the humidity expansion coefficient be at most $10^{-4}$/RH %, preferably at most $10^{-5}$/RH %. Further, it is advantageous that these thermal characteristics, dimensional characteristics and mechanical strength characteristics be almost uniform in all in-plane directions with tolerances of 10%.

(Preparation Method)

The process of preparing a magnetic coating composition for the present magnetic disk medium includes at least a kneading step and dispersing step, and further, if required, mixing steps inserted before or after each of these steps. Each step may be parted into at least two stages. All the ingredients used in the invention, including a magnetic powder, a non-magnetic powder, a binder, carbon black, an abrasive, an antistatic agent, a lubricant and a solvent, may be added at the start of or halfway through any of the steps. Further, each ingredient may be divided into at least two portions, and these portions may be added in separate steps. For instance, polyurethane may be divided into three portions, and these portions may be charged in the kneading step, the dispersing step and the mixing step for viscosity adjustment after dispersion, respectively. To achieve the aim of the invention, known preparation techniques can be applied to some of steps. In the kneading step, it is advantageous to use a mighty kneading machine, such as an open kneader, a continuous kneader, a pressure kneader and an extruder. In the case of using such a kneader, a binder in all or a part of the required amount (preferably at least 30 weight % of the required amount) is kneaded with a magnetic powder or a non-magnetic powder in a proportion of 15 to 500 parts by weight to 100 parts by weight of the magnetic powder. The details of kneading processing are described in JP-A-1-106338 and JP-A-1-79274. Although glass beads can be used for dispersion of coating compositions for the magnetic layer and the underlayer, it is advantageous for dispersion of hexagonal ferrite powder to use a dispersing medium of high gravity, such as zirconia beads, titania beads or steel beads. In using such a dispersing medium, its particle size and packing rate are optimized. For dispersion, known dispersing machine can be used.

When the present magnetic disk is formed by coating multiple layers, it is preferable to adopt one of the following three methods:

a first method wherein a lower layer is coated by means of a coating machine generally used in coating a magnetic coating composition, such as a gravure coater, a roll coater, a blade coater or an extrusion coater, and then, while the lower layer is still in a wet condition, an upper layer is coated thereon by means of an extrusion coating machine of pressurized support type as disclosed in JP-B-1-46186, JP-A-60-238179 and JP-A-2-265672, a second method wherein an upper layer and a lower layer are coated almost simultaneously by means of a coating head having two slits for passage of coating compositions as disclosed in JP-A-63-88080, JP-A-2-17971 and JP-A-2-265672, and a third method wherein an upper layer and a lower layer are coated almost simultaneously by means of a backup roll-attached extrusion coater as disclosed in JP-A-2-174965.

In addition, in order to prevent the magnetic disk medium from causing deterioration in electromagnetic conversion characteristics by cohesion of magnetic particles, it is preferable to impart shear to the coating composition inside the coating head by use of the method as disclosed in JP-A-62-95174 and JP-A-1-236968. Further, the coating composition is required to have a viscosity meeting the numerical value range disclosed in JP-A-3-8471. Of course, sequential coating of multiple layers, wherein after coating a lower layer and drying it, a magnetic layer is coated thereon, may be adopted in forming the present layer structure.

Although the present magnetic disk medium can sometimes have sufficiently isotropic orientation without using any orientation apparatus, it is preferable to make the magnetic disk medium have isotropic orientation by the use of a known random orientation apparatus, e.g., an apparatus equipped with cobalt magnets aligned in a staggered format or an apparatus equipped with a solenoid for application of an alternating magnetic field. In the case of using hexagonal ferrite powder, the magnetic disk medium tends to have in-plane and vertical, three-dimensional random orientation, but it is possible to make the magnetic disk medium have in-plane two-dimensional random orientation. On the other hand, a magnetic property isotropic in the circumferential direction can be imparted to the disk medium when vertical orientation is performed using a known method, e.g., by use of polarity-opposed magnets. In the case of carrying out high-density recording in particular, vertical orientation is preferred. Moreover, circumferential orientation may be provided by spin coating.

It is appropriate that the drying position on the coating layer be controlled by properly adjusting the temperature and volume of drying air and the coating speed. Specifically, the coating speed may be chosen from the range of 20 to 1,000 m/min, and the suitable temperature of drying air is 60° C. or above. In addition, the coating layer may undergo appropriate pre-drying treatment before it enters into the magnet zone.

After drying, the magentic disk medium is generally subjected to calendering treatment. As a roll for calendering, a heat-resistant plastic roll, such as a roll made from epoxy resin, polyimide, polyamide or polyimideamide, or a metal roll can be used. In the case of providing magnetic layers on both sides, it is preferable that the calendering be performed between two metal rolls. The suitable treatment temperature is not lower than 50° C., preferably 100° C. or above, and the suitable linear pressure applied is at least 200 kg/cm (196 kN/m), preferably at least 300 kg/cm (294 kN/m).

(Physical Characteristics)

It is appropriate that the magnetic layer of a magnetic disk medium relating to the invention have a saturated magnetic flux density of 80 to 3,000 mT. The coercive forces Hc and Hr are generally from f 1,500 to 4,000 Oe (from 120 to 320 kA/m), preferably from 2,000 to 3,000 Oe (from 160 to 240 kA/m). With respect to the coercive force distribution, the narrower the better. The suitable values of SFD and SFDr are each 0.6 or below. Further, the magnetic layer has a squareness ratio of 0.45 to 0.65 when it is in a randomly oriented state, 0.6 or above, preferably 0.7 or above, in the vertical direction when it is in a vertically oriented state, and at least 0.7, preferably at least 0.8 when diamagnetic field correction is made.

The suitable coefficient of the friction of the present magnetic disk medium with a head is 0.5 or below, preferably 0.3 or below, under a temperature ranging from $-10°$ C. to $40°$ C. and a humidity ranging from 0% to 95%. The suitable specific resistance at the magnetic layer surface is from $10^4$ to $10^{12}$ $\Omega$/sq, and the suitable electrification potential is within the range of $-500$ V to $+500$ V. Further, it is appropriate that the magnetic layer have an elasticity modulus of 100 to 2,000 kg/mm$^2$ (980 to 19,600 N/mm$^2$) under a 0.5% elongation in all in-plane directions, and a tensile strength of 10 to 70 Kg/mm$^2$ (98 to 686 N/mm$^2$) at break. On the other hand, it is advantageous that the magnetic disk medium has an elasticity modulus of 100 to 1,500 kg/mm$^2$ (980 to 14,700 N/mm$^2$) in all in-plane directions, a residual elongation of at most 0.5% and a thermal shrinkage of at most 1%, preferably at most 0.5%, particularly preferably at most 0.1%, at all of temperatures up to 100° C. The suitable glass transition temperature of the magnetic layer (the maximum point of loss elasticity modulus in the kinetic viscoelasticity measurement made at 110 Hz) is from 50° C. to 120° C., and that of the underlayer is from 0° C. to 100° C. The appropriate loss elasticity modulus is from $1 \times 10^3$ to $8 \times 10^4$ N/cm$^2$, and the appropriate loss tangent is at most 0.2. When the loss tangent is too great, a tackiness trouble tends to occur. It is preferable that these thermal characteristics and mechanical characteristics are almost uniform in all in-plane directions of the medium with tolerances of 10%. The appropriate content of a residual solvent in the magnetic layer is 100 mg/m$^2$ or below, preferably 10 mg/m$^2$ or below. As to the porosity of each coating layer, it is appropriate that both lower and upper layers have a porosity of 30 volume % or below, preferably 20 volume % or below. The smaller porosity is more favorable for achieving high output, but the porosity may be increased to an extent necessary for a certain particular purpose. For instance, in the case of repetition use-oriented disk media, it frequently occurs that the greater porosity is more favorable for ensuring running durability.

The suitable center-plane average surface roughness Ra of the magnetic layer is 5 nm or below, preferably3 nm or below, particularly preferably 2 nm or below, as measured with TOPO-3D. And it is appropriate for the magnetic layer to have a maximum height Rmax of at most 200 nm, a ten-point average roughness Rz of at most 80 nm, a center-plane peak height Rp of at most 80 nm, a center-plane valley depth Rv of at most 80 nm, and an average wavelength $\lambda$a of 5 to 300 $\mu$m. The number of projections on the magnetic layer surface, which measure 0.01 to 1 $\mu$m in size, can be arbitrarily adjusted to the range of 0 to 2,000, thereby optimizing the friction coefficient. These surface features can be achieved with ease by controlling surface properties of the support by addition of filler and properly choosing the grain size and the amount of a powder added to the magnetic layer and the surface profile of rollers used for calendering.

When the present magnetic disk medium has a multilayer structure, it is inferred with ease that those physical characteristics of the magnetic layer may differ from those of the underlayer depending on the intended purposes. For instance, high elasticity modulus is conferred on the magnetic layer to improve the running durability, and at the same time the elasticity modulus of the underlayer is rendered lower than that of the magnetic layer to ensure a desirable touch of a head on the magnetic disk medium.

EXAMPLES

Now, the invention will be illustrated in more detail by reference to the following examples, but these examples should not be construed as limiting the scope of the invention in any way. Additionally, all "parts" in the following examples are by weight unless otherwise noted.

Sample 1

The ingredients to constitute each of the following magnetic coating composition A and non-magnetic coating composition were kneaded with a kneader, and then dispersed with a sand mill. To the dispersions thus prepared, polyisocyanate was added in an amount of 13 parts in the case where the dispersion was prepared for a-non-magnetic layer, and it was added in an amount of 4 parts in the case where the dispersion was prepared for a magnetic layer. Furthermore, 30 parts of cyclohexanone was added to each of the coating compositions. The resulting compositions were each passed through a filter having an average pore size of 1 $\mu$m, thereby preparing coating compositions for forming an underlayer and a magnetic layer respectively.

The non-magnetic layer coating composition thus prepared was coated on a 53 $\mu$m-thick polyethylene terephthalate support having a center-plane average surface roughness of 3 nm so that the non-magnetic layer coated had a dry thickness of 0.15 $\mu$m. After drying the non-magnetic layer, a magnetic layer was coated thereon so as to have a dry thickness of 0.1 $\mu$m. After drying, the support provided with the coatings was treated with a 7-stage calender under a temperature of 90° C. and a linear pressure of 300 Kg/cm (294 kN/m), and then stamped into disks measuring 5 mm in inside diamter and 46 mm in outside diamter. Further, each disk was subjected to heat treatment for 24 hours in a 55° C. thermostat.

Sample 2

Sample 2 was prepared in the same manner as Sample 1, except that the heat treatment after stamping was omitted.
[0041]

Samples 3 to 5

Samples 3 to 5 were prepared in the same manner as Sample 1, except that the temperatures under which they received the heat treatment after stamping were changed as shown in Table 1, respectively.

Samples 6 to 13

Samples 6 to 13 were prepared in the same manner as Sample 1, except that the disks were stamped out so as to have inside diameters and outside diameters shown in Table 1, respectively.

Samples 14 to 19

Samples 14 to 19 were prepared in the same manner as Sample 1, except that the supports used therein had different thickness values shown in Table 1, respectively.

Samples 20 to 26

Samples 20 to 26 were prepared in the same manner as Sample 1, except that the polyethylene naphthalate support used in Sample 1 was replaced with polyethylene terephthalate supports having the thickness values shown in Table 1, respectively.

| Magnetic coating composition A: | |
|---|---|
| Hexagonal barium ferrite | 100 parts |
| Hc: 2,500 Oe (200 kA/m) | |
| average tabular diameter: 30 nm | |
| average tabular ratio: 3 | |
| σs: 56 A · m²/kg | |
| Vinyl chloride copolymer | 6 parts |
| (MR110, a product of ZEON CORP.) | |
| Polyurethane resin | 3 parts |
| (UR8200, a product of Toyobo Co.) | |
| α-Alumina | 4 parts |
| (HIT60, a product of Sumitomo Chemical Co., Ltd.) | |
| Diamond (average grain size: 100 nm) | 2 parts |
| Carbon black | 1 parts |
| (#50, a product of Asahi Carbon Co., Ltd.) | |
| Isocetyl stearate | 5 parts |
| Stearic acid | 1 parts |
| Oleic acid | 1 parts |
| Methyl ethyl ketone | 80 parts |
| Cyclohexanone | 120 parts |
| Non-magnetic coating composition: | |
| α-Fe₂O₃ hematite | 100 parts |
| Average major axis length: 0.07 μm | |
| Average minor axis length: 0.014 μm | |
| S$_{BET}$: 55 m²/g | |
| pH: 9 | |
| Carbon black (average particle size: 20 nm) | 25 parts |
| (CONDUCTEX SC-U, a product of Colombia Carbon Co.) | |
| Vinyl chloride copolymer | 15 parts |
| (MR104, a product of ZEON CORP.) | |
| Polyurethane resin | 7 parts |
| (UR5500, a product of Toyobo Co.) | |

| -continued | |
|---|---|
| Phenylphosphonic acid | 4 parts |
| Isocetyl stearate | 6 parts |
| Oleic acid | 1.3 parts |
| Stearic acid | 1.3 parts |
| 8:2 Mixture of methyl ethyl ketone and cyclohexanone | 250 parts |

Performances of the thus obtained magentic disk media were evaluated in accordance with the following methods, respectively. And evaluation results obtained are shown in Table 1.

1) Determination of Curl Quantity

Curl quantity was determined in accordance with the method described hereinbefore.

2) Measurement of Head Penetration

By the use of a composite AMR head having a write track width of 1.5 μm, a gap length of 0.3 μm and a read track width of 0.9 μm, a disk evaluation apparatus RWA-1001 made by Guzik Technical Enterprises and a positioning spinstand Model LS-90 made by Kyodo Denshi System Co., Ltd., recording and playback of signals with a line packing density of 180 KFCI were performed on each sample disk at a rotational speed of 3,000 rpm in both a position 5 mm away from the innermost diameter toward the outside diameter and a position 5 mm away from the outermost diameter toward the inside diameter as the position of the head relative to the reference plane of the disk was moved up and down, thereby examining relation between up-and-down movements of the head and changes in reproduced output. The range of head positions producing from the maximum output to not lower than 80% of the maximum output was determined and defined as penetration window.

TABLE 1

| | | Support | | Inside diameter | Outside diameter | | Heat treatment | | Curl | Penetration Window | |
|---|---|---|---|---|---|---|---|---|---|---|---|
| Sample | note | sort | thickness (μm) | X (mm) | Y (mm) | X/Y | temp. (°C.) | time (hrs) | quantity (mm) | inner region (μm) | outer region (μm) |
| 1 | invention | PEN | 53 | 5 | 46 | 0.11 | 55 | 24 | 0.2 | 300< | 300< |
| 2 | comparison | PEN | 53 | 5 | 46 | 0.11 | — | — | 1.5 | 300< | 100 |
| 3 | invention | PEN | 53 | 5 | 46 | 0.11 | 40 | 24 | 0.3 | 300< | 300< |
| 4 | invention | PEN | 53 | 5 | 46 | 0.11 | 70 | 24 | 0.2 | 300< | 300< |
| 5 | comparison | PEN | 53 | 5 | 46 | 0.11 | 80 | 24 | 2 | 200 | 100 |
| 6 | invention | PEN | 63 | 8 | 46 | 0.17 | 55 | 24 | 0.2 | 300< | 300< |
| 7 | invention | PEN | 53 | 9 | 46 | 0.20 | 55 | 24 | 0.2 | 300 | 300 |
| 8 | comparison | PEN | 53 | 10 | 46 | 0.22 | 55 | 24 | 0.2 | 200 | 200 |
| 9 | invention | PEN | 53 | 3 | 46 | 0.07 | 55 | 24 | 1 | 300< | 300 |
| 10 | comparison | PEN | 53 | 2 | 46 | 0.04 | 55 | 24 | 2 | 200 | 100 |
| 11 | comparison | PEN | 53 | 5 | 20 | 0.25 | 55 | 24 | 1.5 | 200 | 200 |
| 12 | invention | PEN | 53 | 5 | 25 | 0.20 | 55 | 24 | 0.5 | 300 | 300 |
| 13 | invention | PEN | 53 | 5 | 50 | 0.10 | 55 | 24 | 0.2 | 300< | 300< |
| 14 | invention | PEN | 30 | 5 | 46 | 0.11 | 55 | 24 | 0.5 | 300< | 300< |
| 15 | invention | PEN | 20 | 5 | 46 | 0.11 | 55 | 24 | 1 | 300< | 300 |
| 16 | comparison | PEN | 10 | 5 | 46 | 0.11 | 55 | 24 | 2 | 50 | 100 |
| 17 | invention | PEN | 70 | 5 | 46 | 0.11 | 55 | 24 | 0.2 | 300< | 300< |
| 18 | invention | PEN | 80 | 5 | 46 | 0.11 | 55 | 24 | 0.2 | 300< | 300 |
| 19 | comparison | PEN | 90 | 5 | 46 | 0.11 | 55 | 24 | 0.2 | 300< | 200 |
| 20 | invention | PET | 53 | 5 | 46 | 0.11 | 55 | 24 | 0.5 | 300< | 300< |
| 21 | invention | PET | 30 | 5 | 46 | 0.11 | 55 | 24 | 0.8 | 300< | 300< |
| 22 | Invention | PET | 20 | 5 | 46 | 0.11 | 55 | 24 | 1 | 300< | 300 |
| 23 | comparison | PET | 10 | 5 | 46 | 0.11 | 55 | 24 | 3 | 50 | 50 |
| 24 | invention | PET | 70 | 5 | 46 | 0.11 | 55 | 24 | 0.2 | 300< | 300< |
| 25 | invention | PET | 80 | 5 | 46 | 0.11 | 55 | 24 | 0.2 | 300< | 300 |
| 26 | comparison | PET | 90 | 5 | 46 | 0.11 | 55 | 24 | 0.2 | 300< | 200 |

As can be seen from the data shown in Table 1, the present magnetic disk media are suitable as portable small-diameter media, and besides, they can ensure stable penetration characteristics even at the high line-packing density and achieve high capacity.

When the support thickness, the dimensions and the curl quantity of compact magnetic disk media are specified in accordance with the invention, runout of the disk media can be prevented effectively, head penetration characteristics can be improved, and high-capacity recording and playback of at least several hundred megabytes can be performed with high stability and in good condition.

This application is based on Japanese Patent application JP 2002-332266, filed Nov. 15, 2002, the entire content of which is hereby incorporated by reference, the same as if set forth at length.

What is claimed is:

1. A magnetic disk medium comprising a support and a magnetic layer containing a binder and a hexagonal ferrite powder dispersed in the binder,
wherein the support has a thickness of 20 $\mu$m to 80 $\mu$m, and the magnetic disk medium has an inside diameter X of 2 mm to 10 mm, an outside diameter Y of 20 mm to 50 mm, an X/Y ratio satisfying the relation $0.05 \leq X/Y \leq 0.20$ and a curl quantity of 1 mm or below.

2. The magnetic disk medium according to claim 1, wherein signals are capable of being recorded or reproduced thereon when the magnetic disk media is rotated at a rotational speed of 2,000 rpm to 8,000 rpm.

3. The magnetic disk medium according to claim 1, wherein signals recorded on the magnetic disk medium are capable of being reproduced with a magnetic reluctance head.

4. The magnetic disk medium according to claim 2, wherein signals recorded on the magnetic disk medium are capable of being reproduced with a magnetic reluctance head.

5. The magnetic disk medium according to claim 1, wherein the thickness of the support is 30 $\mu$m to 70 $\mu$m.

6. The magnetic disk medium according to claim 1, which has an X/Y ratio satisfying the relation $0.08 \leq X/Y \leq 0.15$.

7. The magnetic disk medium according to claim 1, which has a curl quantity of 0.5 mm or below.

8. The magnetic disk medium according to claim 1, wherein the hexagonal ferrite powder has a particle size of 10 nm to 35 nm.

9. The magnetic disk medium according to claim 1, which has a dimensional change rate of 0.05% or below when the medium is stored at 60° C.

10. The magnetic disk medium according to claim 1, which further comprises a subbing layer so that the support, the subbing layer, and the magnetic layer is in this order.

11. The magnetic disk medium according to claim 10, wherein the subbing layer has a thickness of 0.01 $\mu$m to 2.0 $\mu$m.

12. The magnetic disk medium according to claim 1, which further comprises an underlayer so that the magnetic layer, the underlayer, and the support is in this order.

13. The magnetic disk medium according to claim 12, wherein the underlayer contains anon-magnetic inorganic powder and a binder.

14. The magnetic disk medium according to claim 12, wherein the underlayer contains a carbon black.

15. The magnetic disk medium according to claim 12, which further comprises a subbing layer so that the support, the subbing layer, and the underlayer is in this order.

16. The magnetic disk medium according to claim 15, wherein the subbing layer has a thickness of 0.01 $\mu$m to 2.0 $\mu$m.

* * * * *